United States Patent [19] | [11] 4,109,151
Pleil | [45] Aug. 22, 1978

[54] DUAL FILAMENT X-RAY TUBE USED IN PRODUCTION OF FLUOROSCOPIC IMAGES

[75] Inventor: Viktor W. Pleil, Wheaton, Ill.

[73] Assignee: Picker Corporation, Cleveland, Ohio

[21] Appl. No.: 796,064

[22] Filed: May 12, 1977

Related U.S. Application Data

[63] Continuation of Ser. No. 537,730, Dec. 31, 1974, abandoned.

[51] Int. Cl.[2] ......................... G01N 23/22; H01J 7/44
[52] U.S. Cl. ....................................... 250/460; 315/64
[58] Field of Search .................... 313/236; 315/64, 65; 250/403, 404, 405, 460, 320

[56] References Cited

U.S. PATENT DOCUMENTS

| | | | |
|---|---|---|---|
| 1,660,122 | 2/1928 | Greger | 313/236 |
| 2,686,884 | 8/1954 | Atlee | 250/403 |

OTHER PUBLICATIONS

Clark, George L., *Applied X-Rays,* Fourth Edition, McGraw-Hill, 1955, p. 14.
Sears, Francis Weston, *Principles of Physics III,* 3rd Ed., Addison-Wesley Press, Inc., Cambridge Mass., 1948, pp. 304, 305.
Terman, Frederick Emmons, *Radio Engineers Handbook,* 1st Ed., McGraw-Hill, 1943, pp. 393, 394.

*Primary Examiner*—Davis L. Willis
*Assistant Examiner*—T. N. Grigsby
*Attorney, Agent, or Firm*—Watts, Hoffmann, Fisher & Heinke Co.

[57] ABSTRACT

Method and apparatus is disclosed for providing a beam of X-radiation having an intensity value which is rapidly switchable between nonzero levels. An X-ray tube having one or more electron-emitting thermionic filaments is provided with cathode bias control circuitry for limiting electron flow between the tube's cathode and anode structures. The bias control circuitry applies one of a plurality of predetermined values of negative potential to a cathode cup structure for allowing predetermined quanta of electrons emitted from an energized filament to reach the anode.

One value of the negative potential bias is a relatively large value for cutting off all flow of electrons; a second or intermediate value of negative voltage bias allows a predetermined fraction of the total quanta of emitted electrons to flow; and a third potential value allows a greater number of electrons to flow. Because the bias potential can be rapidly switched to rapidly change the number of electrons striking the anode, the intensity value of the X-ray beam produced is rapidly switchable. The invention finds particularly advantageous application in fluoroscopic examination systems wherein the radiation level is rapidly switched between a relatively low television level and a relatively high spot camera or cine photographic level.

7 Claims, 6 Drawing Figures

DUAL FILAMENT X-RAY TUBE USED IN PRODUCTION OF FLUOROSCOPIC IMAGES

This is a continuation of application Ser. No. 537,730 filed Dec. 31, 1974 and now abandoned.

CROSS REFERENCE TO RELATED PATENTS AND APPLICATIONS

Atlee, SPACE CHARGE CONTROLLED X-RAY TUBE, U.S. Pat. No. 2,686,884, patented Aug. 17, 1954, (hereafter the SPACE CHARGE patent).

Atlee, et al., DOUBLE FOCUS X-RAY TUBE, U.S. Pat. No: 3,649,861, patented Mar. 14, 1972, (hereafter the DOUBLE FOCUS patent).

Atlee, X-RAY TUBE WITH IMPROVED CONTROL ELECTRODE ARRANGEMENT, U.S. Pat. No. 3,783,333, patented Jan. 1, 1974, (hereafter the CONTROL ELECTRODE patent).

F. H. Meyer, RADIATION IMAGING APPARATUS AND METHOD, Ser. No. 537,776, filed Dec. 31, 1974 herewith, (hereafter the SYSTEM patent).

BACKGROUND OF THE INVENTION

1. Field of the Invention

The present system relates generally to X-ray tubes and more particularly relates to method and apparatus for biasing of an X-ray tube to control the flow of electrons between a cathode and an anode.

X-rays are used in a variety of examining procedures in diagnostic medicine. In the more common procedures, an X-ray tube emits a beam of X-rays which is passed through a patient. After passing through the patient the X-rays impinge upon a sheet of X-ray film or upon a fluoroscopic system positioned near the patient and opposite the tube. Absorption of X-rays by the patient changes the intensity of the beam. The beam of changed intensity produces a shadow image indicative of the condition of the internal structure of the patient and is an aid in diagnosing illnesses.

For the more common diagnostic procedures, the value of the intensity of the X-rays which are directed to the subject depends upon several factors. An important factor is the range of intensities which will clearly highlight the internal structure of the subject, while minimizing the radiation dosage the patient receives.

Other intensity determining factors relate to the type of recording or monitoring equipment which is used for producing diagnostic information. For example, higher intensity X-rays are required to expose the sheet of radiographic film than are required by the fluoroscopic system for producing a visual image. More specifically, radiography requires on the order of 600 milliamperes of tube current for 10–100 milliseconds, while fluoroscopy requires substantially continuous tube current, but only 7–10 milliamperes or less. The production of radiographs is concerned with exposures of short duration in which images of high resolution are essential. Even though attempts have been made at reducing the amount of energy required for radiographs, such as by using intensifying screens adjacent the radiographic film, relatively high intensities are still required.

Fluoroscopy is advantageous in applications in which the changes in radiopacities in the subject are in motion or are otherwise time varying. For example, an examiner can fluoroscopically monitor the progress of a radiopaque material through the digestive tract, or can observe the diffusion of the material through the circulatory system.

In modern systems image intensifier tubes are used to produce so-called bright fluoroscopy. The intensity of the X-ray beam which impinges upon the image tube must be coordinated with the intended usage of the output from the tube. Some modern examination systems have the combined ability to take photographs and to provide television images. The advantages of such a dual function system are that the examiner can operate substantially continuously in the fluoroscopy mode to observe generally variations in the radiopacity of portions of the subject body, and can make a permanent record in the form of still or "spot" photographs or cine films of the image intensifier output at desired times.

The described system focuses a television camera on an output screen of the image tube for visually displaying the complete examination. The system also provides a cine camera or a spot camera focused on the tube's output screen for additionally recording photographic images at selected times during an examination.

The television camera requires a less intense image on the output screen than does either a cine camera or a spot camera. For example, the television camera requires only 7–10 milliamperes or less while a camera requires up to 30 milliamperes.

In systems such as that described in the SYSTEM patent, the intensity of the output screen of the fluoroscopic device must be increased very rapidly to a relatively high level during the time the photographic camera is being operated and must be decreased very rapidly to the operating level of the television camera for the rest of the time. Since rapid changes in the intensity on the output screen are required, rapid changes in the intensities of the X-ray beam impinging upon the image tube are needed. Additionally, because it is desirable to pass only the minimumly acceptable amount of radiation through the subject, the increased level of intensity required for cine and photographs should be for as short a period as possible.

THE PRIOR ART

Various prior proposals have suggested ways of controlling the output from an X-ray tube by controlling the emission of electrons which strike an X-ray emitting anode. Early proposals merely changed the amount of so-called filament electrical current passing through the filament. Because the temperature of the filament is directly proportional to the amount of filament current flowing, control of the current flowing also controlled the electron emission.

There is a lag time between the change in current flowing and the responsive change in filament temperature. For applications requiring rapid switching, such as the dual fluoroscopy system of the SYSTEM patent, this method has proven unacceptable.

The prior art has proposed use of a grid electrode positioned between the electron emitting filament and the anode. Application of a bias potential on the grid electrode controlled the electron flow to the anode. A bias applied to the grid electrode which was positive relative to the filament enhanced electron flow. A negative potential applied to the grid electrode cut off all electron flow. One such grid controlled system is set forth in the referenced SPACE CHARGE patent. Although an X-ray tube having a grid electrode was sufficient for many applications, in other applications it had disadvantages such as causing a distorted pattern of electrons on the target.

The prior art has also suggested the application of a bias voltage potential applied to the cathode cup for cutting off the flow of electrons to the anode. The referenced SPACE CHARGE and CONTROL ELECTRODE patents each describe the application of a negative bias to the cathode cup for cutting off the flow of electrons. These prior art teachings thus related merely to the use of negative bias to cut off the flow of electrons and not to switch the intensity of the flow between predetermined nonzero values.

The prior art has suggested the use of a dual filament X-ray tube for providing an X-ray beam having its intensity switchable between predetermined nonzero values. In the above-referenced DOUBLE FOCUS patent, dual filaments were respectively provided in a common cathode cup. The filaments were simultaneously energized with filament current for releasing two flows of electrons or alternatively by applying a filament current to only one-half of one of the filaments a smaller bombarded target area was obtained. A bias voltage could be applied to the cathode cup for cutting off the flow of electrons. Switching from one focal spot to another was relatively slow because of thermal lag in the filaments which is present when switching is accomplished with a filament current circuit.

Another conventional switching technique is through control of the high tension power supply used to supply power for X-ray generation. High tension switching is, of necessity, relatively slow.

The above-referenced CONTROL ELECTRODE patent teaches the switching through a bias potential from one filament to another. The CONTROL ELECTRODE patent requires a pair of electrically isolated cathode structures which are individually biased for controlling electron flow from their respective filaments. This requires a relatively complex cup structure and an additional conductor must be fed from the cathode assembly within an evacuated envelope to a connection external of the envelope. There is no suggestion of high speed switching of a single energized filament from one operating level to another through the use of a bias of a cathode cup that supports both filaments.

Accordingly, other than the teachings of this CONTROL ELECTRODE patent, the prior art has suggested methods of providing an X-ray beam with an intensity switchable between two nonzero levels, which include: (1) changing the level of filament current in one filament; (2) providing a dual filament X-ray tube and selectively providing filament current to the respective filaments in sequence; and, (3) control of the high tension applied to the tube. Prior art proposals are thus characterized by a slow switching time because switching from one energy level to another, as distinguished from switching on and off, has been accomplished through control of filament temperatures or high tension switching.

SUMMARY OF THE INVENTION

The present invention provides an X-ray tube and associated biasing circuitry and method which produces an X-ray beam having an intensity value which is rapidly switchable between nonzero levls. Switching delays due to finite thermal reponse times of electron emitting filaments are eliminated without the requirement of an additional grid element or a dual cup arrangement. The invention is extremely versatile and is applicable to existing single filament and dual filament X-ray tubes.

In accordance with the invention, an X-ray tube is provided with cathode bias control circuitry for controlling the flow of electrons from a cathode structure to an anode structure. The X-ray tube has one or more electron emitting elements, such as thermionic filaments, insulatedly supported by a cathode cup forming a part of the cathode structure. The filaments are selectively energized to produce responsive streams of electrons which flow to the anode structure when a tube operating potential is applied between the filaments and the anode structure.

The bias control circuitry applies one of several predetermined voltage potentials to the cathode cup. Each predetermined potential produces a corresponding bias which allows only a predetermined flow of electrons to the anode structure, notwithstanding continuous full application of filament current and high tension potential across the tube.

In a preferred embodiment, a dual filament tube has a larger and a smaller filament for respectively producing larger and smaller focal spots on a target region of the anode structure. The larger filament is energized for radiographic uses, and the smaller filament is energized for fluoroscopic purposes. The bias control circuitry may apply any one of three predetermined voltage potentials on the cathode cup during operation of either filament.

The control bias generator applies either a low voltage potential with respect to the electron emitting filament, or a relatively high negative voltage potential to completely shut off flow of electrons, or an intermediate value of negative voltage to allow a fractional flow to the anode of the maximum number of available electrons. The beam of X-radiation produced in response to the controlled flow of electrons to the anode has an intensity value which is rapidly switchable between maximum and intermediate nonzero levels and a zero level.

The principal purpose is to permit selective predetermined bias of the smaller, or fluoroscopic, filament according to the type of ultimate image produced during fluoroscopy. Thus, the rapid switching feature of the invention is especially advantageous in an X-ray examination system operating in the fluoroscopic mode, which requires rapid switching between relatively lower television intensity levels and relatively higher photographic intensity levels.

Accordingly, a general object of the present invention is to provide a novel and improved X-ray system which provides an X-ray beam having intensity levels rapidly switchable between nonzero values.

Other objects and a more complete understanding of the invention may be obtained upon referring to the following description of a preferred embodiment when taken in conjunction with the accompanying drawings.

DESCRIPTION OF THE PREFERRED EMBODIMENT

Figure 1:
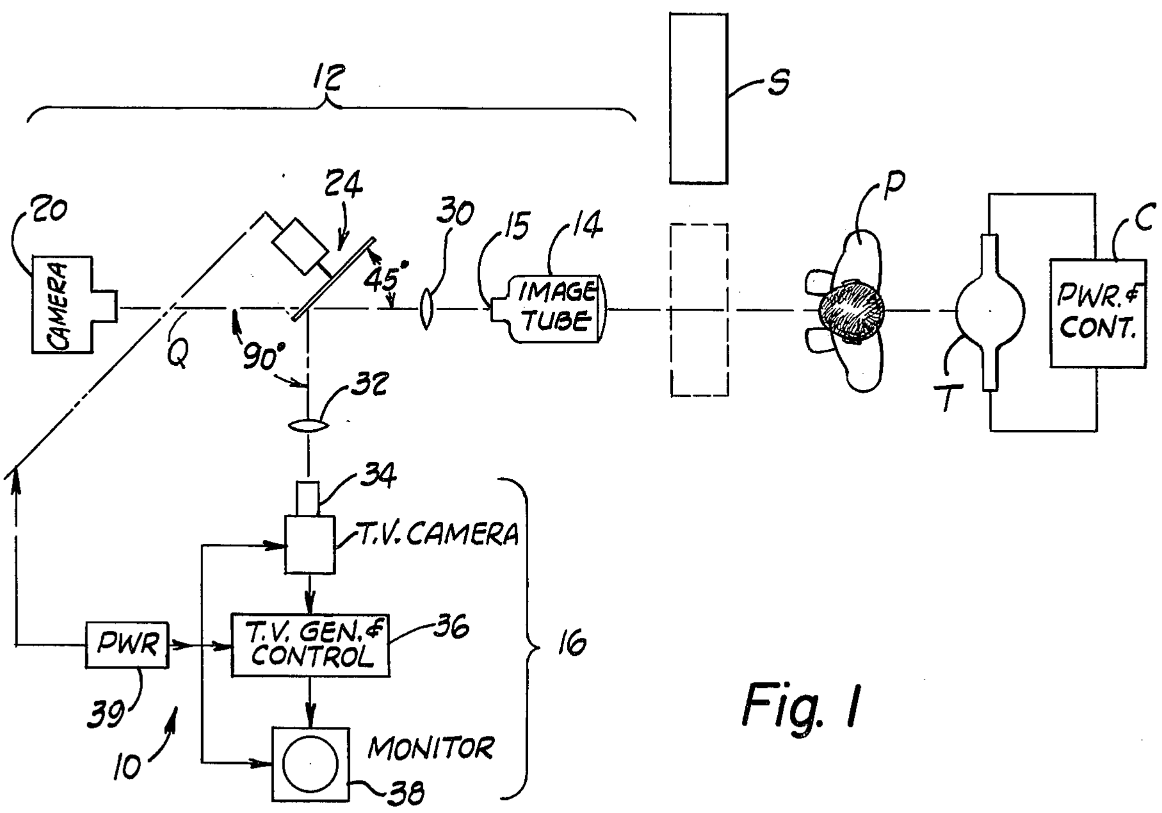
FIG. 1 is a schematic drawing of an examination system in which the invention may be employed.

FIG. 1 shows an examination system for producing visual images of radiation emanating from a subject. The system includes a tube head T. The tube head T includes an X-ray tube which is a source of X-rays. X-rays are directed through a subject, shown in FIG. 1 as a patient P. The X-rays from the tube head T pass through the patient P and emerge from his body in patterns indicative of his condition.

The system 10 optionally includes a spot filmer S for making radiographic images of the patterns of radiation emerging from the body of the patient P, and a fluoroscopic system, generally designated as 12. The fluoroscopic system 12 responds to the radiation to produce light images representing the patterns of emerging radiation. The system 12 produces both spot or cine films representing the radiation patterns, and a continuous television display representing the energy patterns emerging from the body of the patient P.

The spot filmer S is movable into and out of interposition with the path of the X-ray patterns emerging from the body of the patient P. The spot filmer S is shown in solid line in FIG. 1 in its withdrawn position, and is shown in phantom in FIG. 1 in its operative position in the path of the X-rays.

The fluoroscopic system 12 includes an image intensifier tube 14. The image intensifier tube 14 receives the X-radiation from the body of the patient P and converts this radiation to light images which appear at an output 15 of the image intensifier tube 14 and propagate along a path Q.

The fluoroscopic system 12 also preferably includes a television imaging system 16 for producing a video recording and the continuous display. The fluoroscopic system also includes camera 20 which may be either a spot or a cine camera. The camera 20 is positioned to receive light transmitted along the path Q.

A diverter 24 is interposed in the path Q of the light energy emanating from the output 15 of the image intensifier tube 14. The diverter 24 operates selectively to direct the light energy from the tube output 15 to the television imaging system 16 or to permit the direct transmission of light to the camera 20.

The camera 20 is preferably a spot camera having apparatus for supporting a portion of roll light-sensitive film in position to be exposed by light entering a lens assembly of the camera. The camera 20 has its lens assembly interposed in the path Q of the light energy from the image intensifier tube 14. Light from the image at the output 15 of the tube 14 thus passes directly to the lens of the camera 20 to expose its light-sensitive film. This arrangement eliminates distortion which might otherwise result if the light energy from the output 15 were reflected or otherwise processed before impingement upon the film in the spot camera 20.

A collimating lens 30 is positioned in the path Q between the output 15 of the image intensifier tube 14 and the diverter 24. The collimating lens 30 has its exit pupil located substantially downstream of the lens itself (to the left as shown in FIG. 1). Preferably, the exit pupil of the lens 30 should be located in the region of the diverter 24.

The television imaging system 16 is disposed transversely to the path Q. The television imaging system includes a focusing lens 32, a television camera 34, television generation and control circuitry 36, a television display 38, and a power supply 39.

The X-ray tube head T emits X-radiation through the body of the patient P for subsequent processing, as generally described above. The X-ray tube head T is preferably capable of emitting X-rays at any of three intensity levels. A first, or highest level, is used for making radiographs by use of the spot filmer S. In the system shown, a second, or intermediate level, is employed in making spot or cine films. A third, or still lower level, is employed for generating a continuous television image.

The X-ray tube head T in the examination system 10 utilizes the present invention and is associated with control circuitry C for varying the intensity of its X-ray output beam between the three levels with extreme rapidity.

The diverter 24 includes a mirror or beam splitter which, circumferentially speaking, is relatively small. The mirror is rotated at high speed. The X-ray tube is switched between its two fluoroscopic levels in synchronism with the mirror rotation to selectively provide appropriate light levels for the camera 20 and the television system 16.

A more detailed description of this examination system which requires the rapid switching feature of this invention is found in the above-referenced SYSTEM patent, which is hereby incorporated by reference.

Figure 2:
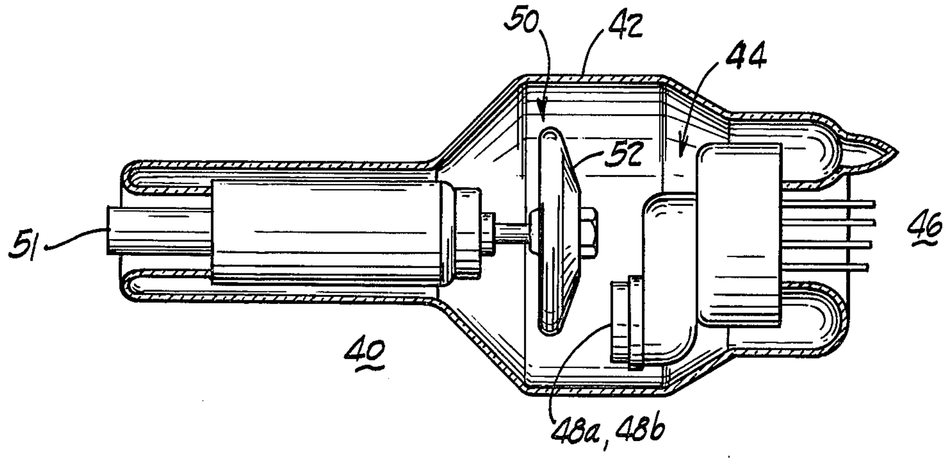
FIG. 2 is a cross-sectional view of an X-ray tube used in the system of this invention.
Figure 3A:
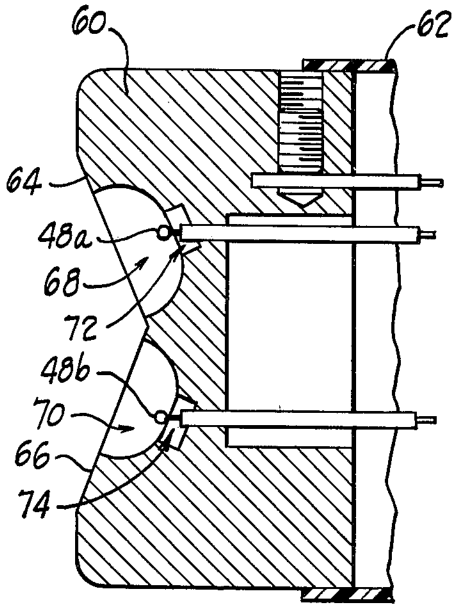
FIGS. 3*a* and 3*b* are cross-sectional and end views of the cathode structure of the X-ray tube of FIG. 2.
Figure 3B:
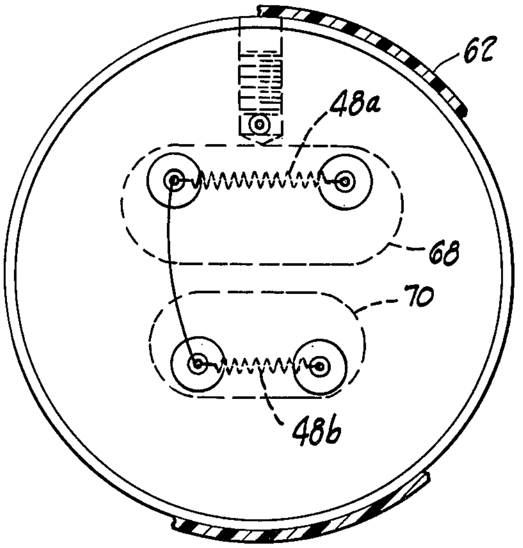

Referring to FIG. 2, the tube head T includes an X-ray tube 40 with which the invention may be utilized. The tube 40 includes a glass envlope 42 which defines an evacuated housing, a cathode structure 44, and a target defining anode structure 50 mounted in the housing. The cathode structure includes electron emitting elements in the form of thermionic filaments ***48a*, *48b* supported by the remainder of the cathode structure 44. Electrical inputs 46** are connected to the filaments and project from the housing.

A high tension, tube operating potential is applied via the electrical inputs 46 and a connection at 51 between the anode structure 50 and the cathode structure 44. When filament heating current is supplied via the inputs 46 to one of the electron emitting filaments ***48a*, *48b*, the current heats the filament causing it to emit electrons. The tube operating potential causes the electrons to flow to and impinge upon the target of the anode structure 50. In response to the electrons, the anode structure 50 generates a beam of X-rays which pass through the envelope 42** to the subject under examination.

Figure 4:
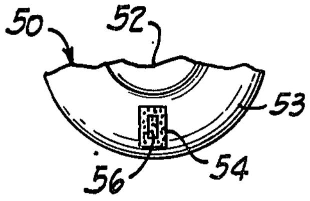
FIG. 4 is a fragmentary view of a portion of the anode of the X-ray tube of FIG. 2; and, FIG. 5 is a schematic diagram of the control circuitry used for operating the X-ray tube of FIG. 2.

As seen in FIG. 4, the anode structure is comprised of an anode face 52 having an outer peripheral region 53. The region 53 is preferably a refractory metal material which emits X-rays when bombarded by electrons. The electron emitting filaments ***48a*, *48b* are selectively energized to provide the respective streams of electrons of flow to the region 53 to define large and small target areas 54, 56 respectively. The large target area 54 is used for spot filming in the system 10 and the small target area is used for fluoroscopy in the system 10**.

The cathode structure 44 is shown in detail in FIGS. *3a* and *3b*. The cathode structure 44 includes a metal body or cup 60 and a tubular, nonconductive supporting sleeve 62. The supporting sleeve is supported from the envelope 42.

The body 60 defines a re-entrant surface facing the targets 54, 56. The surface is in the form of a pair of planar face portions 64, 66. A pair of focusing cup recesses 68, 70 are respectively formed within the face portions 64, 66, for focusing the emitted electrons on the targets 54, 56. The focusing cup recesses 68, 70 are of generally elongated shape with the recess 68 of a longer dimension than the recess 70. Each recess 68, 70 has a relatively narrow bottom slot or gap 72, 74, respectively. The slots extend through the body 60 to allow access to the electrical inputs 46.

The electron emitting filaments **48*a*, 48*b* are respectively mounted within the focusing cup recesses 68, 70. Each filament is comprised of a coil of thoriated tungsten or other suitable filament material. The radiographic filament 48*a* is longer in length than the fluoroscopic element 48*b*, and the respective lengths of the recesses 68, 70** are selected to accommodate the filaments.

Figure 5:
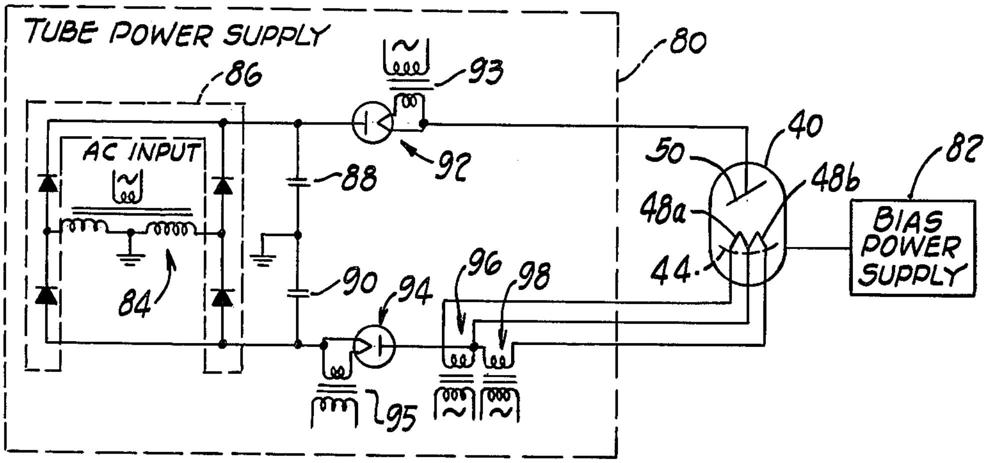

A schematic diagram of the power and control circuitry C is shown in FIG. 5. A tube power supply 80 and a bias power supply 82 are provided to supply operating power and bias potential to the tube 40. The tube power supply 80 provides filament current to the filaments **48*a*, 48*b* and provides high tension operating potential between the filaments and the anode structure 50**.

The bias power supply 82 provides a selected one of several bias potentials to the cathode structure 44 for controlling the quanta of electrons flowing between the filaments **48*a*, 48*b* and the anode structure 50**. Each bias potential creates a selected condition near an energized filament to allow only a predetermined rate of electron flow to the anode structure.

The tube power supply 80 is a conventional power supply and includes a step-up transformer 84 having an input coupled to AC line voltage, and a high voltage rectifier 86 for rectifying the output of the transformer 84. A pair of storage capacitors 88, 90 are coupled to the rectifier 86, and a pair of thermionic control valves 92, 94 are coupled to the storage capacitors. The power supply 80 includes a pair of control transformers 93, 95, respectively coupled to the valves 92, 94. The control valves 92, 94 are respectively coupled for applying a voltage potential to the anode and cathode structures.

A pair of filament transformers 96, 98 are provided. The filament transformers are respectively coupled to the filaments **48*a*, 48*b*** for selectively supplying filament current.

The AC line voltage is stepped up to operating tube voltage, usually 120kv–150kv, by the transformer 84. The stepped up operating voltage is rectified by the rectifier 86 and the storage capacitors 88, 90 are charged up to supply the operating tube voltage.

The bias power supply 82 is any suitable power supply capable of rapidly switching between predetermined values of voltage. The bias power supply 82 provides one of at least three values of bias potential to the cathode cup 60. A first relatively low level is preferably a zero voltage potential with respect to the filaments **48*a*, 48*b* for allowing maximum electron flow. A second or relatively larger level is a highly negative voltage for cutting off the flow of electrons between an energized filament and the anode structure 50. An intermediate level is a negative voltage somewhat less than the relatively large cut-off voltage and allows a number less than maximum of electrons to flow to the anode structure 50**.

For a typical X-ray tube having a hot filament and having a 120kv–150kv operating potential between the hot one of the filaments **48*a*, 48*b* and the anode structure 50**, a bias potential of between −3500 and −4000 volts is required to cut off all electron flow.

As used in an examining system 10 the shorter filament **48*b*** is energized to provide a current flow of 30 milliamperes when zero cathode bias is applied for producing an X-ray beam of an intensity appropriate for spot or cine filming. The intermediate cathode bias voltage potential is selected to allow a tube current flow on the order of 7 to 10 milliamperes or less for producing an X-ray beam of an intensity appropriate for television. The typical range for the intermediate voltage is 60% to 80% of the full cut-off value, but this range varies as tube characteristics vary.

Although this bias power supply 82 is used in the preferred embodiment to control the emisson of the shorter filament **48*b* to accommodate the examining system 10 of FIG. 1, it is understood that the bias power supply 82 may be operated with respect to the longer filament 48*a* to switch its output between two emission levels. For a 1.2 millimeter focal spot 54**, switching from between 400 milliamperes to 30 milliamperes current is readily obtained within a maximum of three milliseconds.

Although the invention has been described with a certain degree of particularity, it is understood that the present disclosure of the preferred embodiment has been made only by way of example. Numerous changes in the details of construction of the X-ray tube and in its operating circuitry, and uses in other types of examination systems may be resorted to without departing from the spirit and the scope of the invention.

What is claimed is:

1. A method of operating an X-ray tube, the X-ray tube being used to produce fluoroscopic images in a system and of the type having a cathode structure including a pair of filaments for emitting electrons to an X-ray generating anode structure, the method comprising the steps of:
   (a) energizing a selected one of the filaments while leaving the other filament de-energized to cause the energized filament to emit electrons;
   (b) applying a voltage potential between the anode structure and the energized filament to produce a flow of electrons to the anode structure; and,
   (c) applying a bias voltage potential between the energized filament and the cathode structure to control the flow of electrons to the anode structure between two X-ray producing operating levels, the step of applying including the alternate steps of:
      (i) applying one bias voltage between the cathode structure and the electron emitter to allow a high flow of electrons; and,
      (ii) applying a second bias voltage to reduce the flow of electrons, the alternate steps respectively producing streams of X-rays of respectively larger and smaller intensities, the electron emitter being switched between its operating levels in synchronism with another component of the system.

2. A method of operating an X-ray tube of the type having a cathode structure including a pair of filaments for emitting electrons to an X-ray generating anode structure, the method comprising the steps of:
   (a) energizing a selected one of the filaments while leaving the other filament de-energized to cause the energized filament to emit electrons;

(b) applying a voltage potential between the anode structure and the energized filament to produce a flow of electrons to the anode structure; and, (c) applying a bias voltage potential between the energized filament and the cathode structure to control the flow of electrons to the anode structure between two X-ray producing operating levels, the step of applying including the alternate steps of:

(i) applying one bias voltage between the cathode structure and the electron emitter to allow a high flow of electrons;

(ii) applying a second bias voltage to reduce the flow of electrons, the alternate steps respectively producing streams of X-rays of respectively larger and smaller intensities; and (iii) applying the alternate first and second X-ray beams to a fluoroscopic system to produce an image having respectively brighter and dimmer intensities.

3. In combination with a fluoroscopic system having an image device which emits light in response to the impingement of X-rays, an X-ray tube system for alternately producing a first beam of X-rays of relatively high intensity and a second beam of X-rays of relatively low intensity to respectively produce light of relatively high and low intensities from the image device, the X-ray tube comprising:

(a) a pair of filaments for emitting selectively and one at a time a flow of electrons;

(b) a cathode structure for supporting the filaments;

(c) an anode structure which defines a target for controllably receiving such flow of electrons and generating X-rays in response thereto;

(d) a filament current supply connected to the filaments for heating the filaments selectively and one at a time;

(e) high tension means for applying a tube operating voltage potential between the anode structure and the filaments to cause such electrons from a heated one of the filaments to impinge upon the target; and, (f) biasing means for establishing a bias potential for controlling the electron flow to the target from either filament when it is energized, the bias potential having at least two predetermined values with a first predetermined value effecting a relatively high flow of electrons from the heated filament, and a second predetermined value establishing a smaller rate of electron flow to and striking the target from the heated filament, the first value causing the target to emit an X-ray beam of relatively high intensity, and the second value permitting emission of an X-ray beam of relatively smaller intensity.

4. The combination according to claim 3 wherein the biasing means selectively provides a third predetermined level of bias voltage which effects a complete cut-off of the flow of electrons.

5. The combination according to claim 3 wherein the second predetermined value of bias voltage is of negative polarity with respect to the first predetermined value.

6. In combination with a fluoroscopic system having an image generator which emits bursts of light in response to the impingement of X-rays, an X-ray tube system for alternately producing a first stream of X-rays of relatively high intensity and a second stream of X-rays of relatively low intensity to respectively produce bursts of high and low intensities on the image device, the X-ray tube comprising:

(a) a cathode structure supporting a pair of filaments;

(b) a supply of filament current connected to the filaments for heating a selected one of the filaments, while the other filament is left unheated;

(c) an anode structure which defines a target for receiving a flow of electrons from an energized filament and generating X-rays in response thereto;

(d) high tension means for applying a tube operating voltage potential between the anode structure and the heated filament to cause the flow of electrons to impinge upon the target; and, (e) biasing means for establishing a bias potential for controlling the electron flow from the heated one of the filaments to the target, the bias means having at least two predetermined operating conditions with the first predetermined condition effecting a high flow of electrons from the heated filament and the second predetermined condition establishing a smaller rate of electron flow from the heated filament to and striking the target, the higher flow causing the target to emit an X-ray beam of relatively high intensity, and the smaller rate of flow causing emission of an X-ray beam of relatively smaller intensity.

7. The combination of claim 6 wherein the biasing means includes a cathode cup.

* * * * *